Nov. 10, 1959 H. W. NORTH 2,911,845
GEAR REDUCTION UNIT
Filed Jan. 29, 1958

INVENTOR.
Henry W. North
BY
Ralph Hammar
Attorney

United States Patent Office 2,911,845
Patented Nov. 10, 1959

2,911,845

GEAR REDUCTION UNIT

Henry W. North, Birmingham, Ala.

Application January 29, 1958, Serial No. 711,949

1 Claim. (Cl. 74—410)

This invention is a gear reduction unit for heavy duty slow speed drives where the load is balanced between two gear trains between a drive shaft and an output gear fixed to the driven shaft. The balance is obtained by a herringbone drive pinion on the drive shaft which is free to float axially and has each half drive a separate gear train. Any unbalance in the load exerts a force shifting the herringbone pinion toward a position of equal load distribution. The tooth loading on the large output gear fixed to the driven shaft is thereby equalized and twice the output is obtained because of the two gear trains feeding the output gear.

Figure 2:
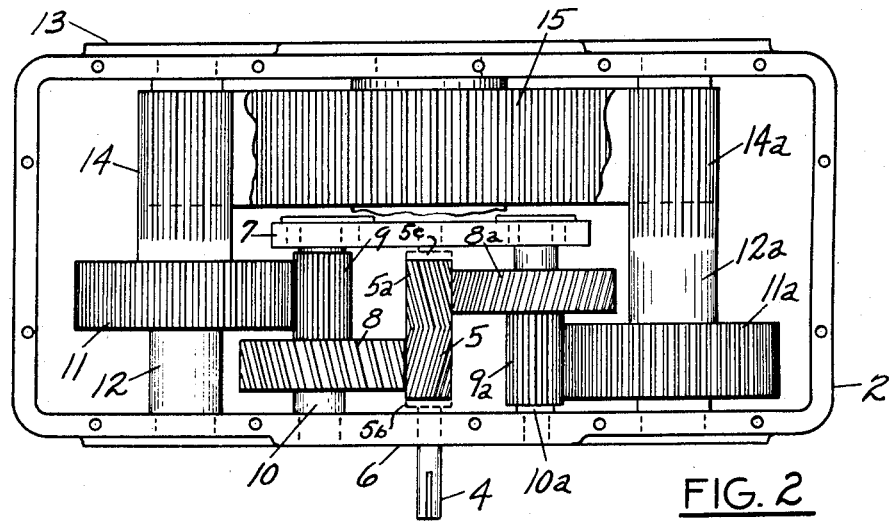
Figure 1:
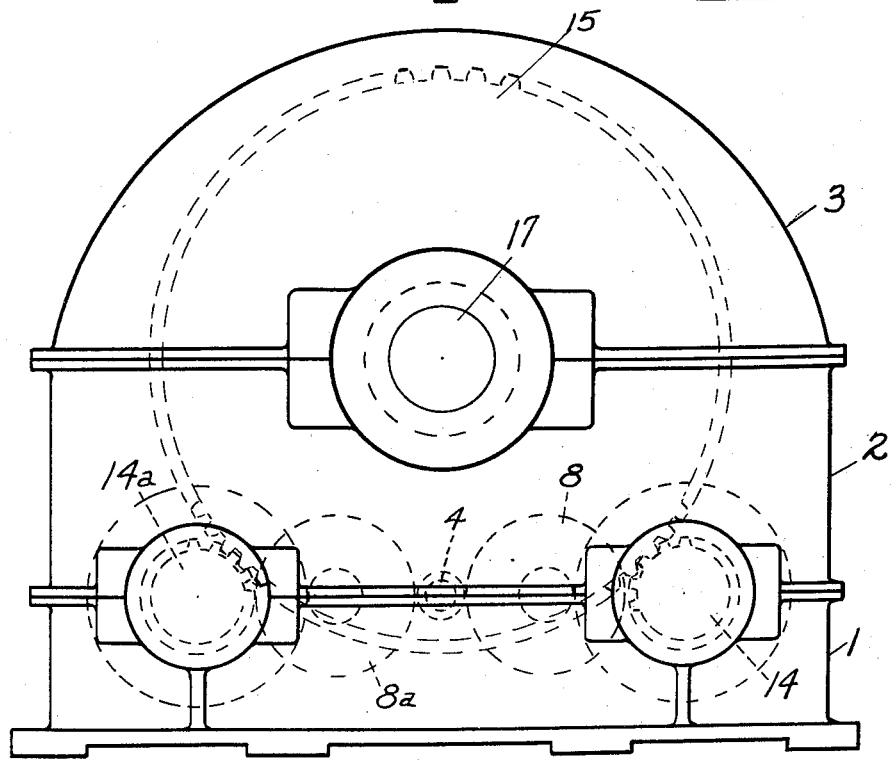

In the drawing, Fig. 1 is a back view of the gear housing and Fig. 2 is a top view with the housing cover removed.

The gear reduction unit is contained within a housing comprising a base section 1, an intermediate section 2, and a top or cover section 3. At the front of the housing is a drive shaft 4 on which is fixed a herringbone gear 5, 5a. The shaft 4 is journaled for free axial movement in the front wall 6 of the gear housing and in an intermediate wall 7. By reason of this floating support, the herringbone gear 5, 5a is free to move axially between the positions indicated by dotted lines 5b and 5c. The section 5 of the herringbone gear meshes with a helical gear 8 fixed on a shaft 10 journaled between the walls 6 and 7. The shaft 10 has cut therein a pinion 9 which drives a gear 11 fixed on a shaft 12 journaled between the front wall 6 of the gear housing and the back wall 13 of the gear housing. In the shaft 12 is cut a pinion 14 which meshes with the output gear 15 fixed on a shaft 17 journaled between the front and back walls 6 and 13 of the gear housing. While the drive shaft 4 is free to float axially, the shafts 10, 12 and 17 are not free to float axially.

The section 5a of the herringbone gear drives a gear train identical in kind with the gear train previously described and the corresponding parts are indicated by the same reference numerals with the subscript $a$. The section 5a meshes with a helical gear 8a on a shaft 10a. The pinion 9a formed on the shaft 10a drives a gear 11a fixed on a shaft 12a. A pinion 14a formed on the shaft 12a drives the large output gear 15. The shafts 10a and 12a are not free to float axially. It will be noticed that there are two pinions 14 and 14a driving the output gear 15 and in order that the teeth of the output gear not be overloaded it is necessary that the load be divided equally between the pinions. This is accomplished by the floating action of the herringbone gear 5, 5a. Whenever one of the sections 5 or 5a of the herringbone gear tends to take more than its equal share of the load, the axial components of the forces of the teeth of the herringbone gear do not balance and the unbalanced force moves the shaft 4 axially to a position in which the axial components of thrust on the teeth of the herringbone gear are in exact balance. This means that the load is at all times shared equally between the pinions 14 and 14a and the output of the gear 15 is effectively doubled. This is important in slow speed drives where the output gear is very large. Although some of the gears are illustrated as spur gears, all could be helical.

The construction of the gear housing makes the gearing very easy to assemble and service. The gear trains between the herringbone gear 5, 5a and the pinions 14, 14a are journaled between the base section 1 and the intermediate section 2 of the gear housing. The output gear 15 is journaled between the intermediate section 2 and the cover section 3.

I claim:

A gear reduction unit comprising a housing having front and back walls and made up of a base section, an intermediate section and a cover section arranged one on top of the other with a housing section parting line between adjacent sections, a supporting structure intermediate and spaced from the front and back walls and from the housing section parting lines and opposite the base and intermediate sections of the housing and independent of the cover section, an output gear between said supporting structure and the back wall of the housing and having an output shaft journaled in the front and back walls of the housing on the housing section parting line between the cover section and the intermediate section, a drive shaft journaled at one end in said supporting structure and at the other end in the front wall of the housing on the housing section parting line between the base section and the intermediate section, said drive shaft being free to float axially, a herringbone gear fixed on the drive shaft having axially spaced sections with teeth oppositely inclined, two separate gear trains between the drive shaft and the output gear, one of the gear trains starting with a gear meshing with one of said sections of the herringbone pinion and ending with a pinion on a shaft journaled between the front and back walls of the housing and meshing with the output gear, the other of the gear trains starting with a gear meshing with the other of sections of the herringbone gear and ending with a pinion on a shaft journaled between the front and back walls of the housing and meshing with the output gear, said gear trains being journaled on fixed axes on the housing section parting line between the intermediate and base sections of the housing whereby the equalization of load between the gear is accomplished by the floating axial movement resulting from the tooth thrust on the sections of the herringbone gear, and said gear trains being arranged on opposite sides of the herringbone gear and of the output gear.

References Cited in the file of this patent

UNITED STATES PATENTS

| | | |
|---|---|---|
| 1,254,708 | Leonard | Mar. 27, 1917 |
| 1,351,317 | Alquist | Aug. 31, 1920 |
| 1,459,964 | Alquist | Apr. 5, 1919 |
| 1,634,376 | Miller | July 5, 1927 |
| 1,704,298 | Levine | Mar. 5, 1929 |
| 1,759,689 | Day | May 20, 1930 |
| 1,817,216 | Uggla | Aug. 4, 1931 |
| 1,949,643 | Bannan | Mar. 6, 1934 |
| 2,081,846 | Behrens | Nov. 14, 1934 |
| 2,131,531 | Behrens | Mar. 16, 1936 |
| 2,167,065 | Eckert | Nov. 28, 1936 |
| 2,327,777 | Falk | May 23, 1941 |
| 2,389,557 | Singer | Nov. 27, 1945 |
| 2,654,267 | Schmitter | Oct. 6, 1953 |
| 2,712,761 | Chung | July 12, 1955 |